June 30, 1959     L. B. GRIFFITH     2,892,545
APPARATUS FOR SLOW STEADY REMOVAL OF DIGESTER LIQUID
Filed Aug. 4, 1954

INVENTOR.
L. B. GRIFFITH
BY
Henry H. Snelling

United States Patent Office

2,892,545
Patented June 30, 1959

2,892,545

APPARATUS FOR SLOW STEADY REMOVAL OF DIGESTER LIQUID

Llewellyn B. Griffith, Arlington, Va.

Application August 4, 1954, Serial No. 447,807

2 Claims. (Cl. 210—97)

This invention relates to the treatment of sewage and industrial wastes and has for its principal object the provision of a method and apparatus for removing definite amounts of supernatant liquid from a tank at a predetermined rate of flow preferably such that the removal of the liquid shall continue constantly at a steady and slow rate for a period of hours, preferably during the hours from midnight to dawn, in case of sewage, and during non-working hours for industrial waste.

A further object of the invention is to provide for removing the liquid in such fashion that there is no danger to the tank either by the production of a vacuum or by permitting excessive pressure. As a portion of this object of the invention, a pump is provided which is not only capable of delivering the chosen small quantity of flow at a slow steady rate but which automatically ceases operation whenever the pressure at the top of the tank becomes negative, and starts again automatically when the pressure is restored. Means are provided for relieving excess pressure independently of the pump.

An important object of the invention is to pump liquid into and out of a digester tank in a sewage system in a manner to avoid any possibility of air entering the top of the digester tank as such air creates the possibility of forming an explosive mixture with the methane gas generated in such a tank.

In systems employing aerobic treatment, the sewage plant feeds to a sludge well, the emergency overflow of which goes back to the plant and during the periods of maximum receipt of raw sewage, to lessen the overflow, a pump discharges from such sludge well to the digester at constant intervals and necessarily at a rather fast rate of flow because otherwise the pump would not be able to discharge the foreign matter including sand, rags, etc.

In systems of this kind the constant discharge of material into the digester causes the strength and the volume of the sewage therein to rise and it is quite impossible to return clear liquid to the treatment plant from the digester at a rate to equalize the sewage receipts because the supernatant liquor in the digester is very toxic to all aerobic types. A further difficulty lies in the fact that in these septic digester tanks strata are formed which contain excessive amounts of solids, these being due to anaerobic action, temperature, the stages of digestion, the stirring effect of the incoming raw sludge, and a number of other factors. The ideal method therefore would include withdrawing the toxic supernatant liquid at times when the solids are least stirred up and taking the liquid from such a depth as at that time of the year would generally be the most free of solids.

Up to the present time it has not been possible to take the supernatant liquid from the digester at a suitably slow rate because piston or impeller pumps not only are incapable of working at the slow speed required but mechanical pumps frequently cause a vacuum in the top of the digester and this has caused a collapse of the top concrete panel of the vat or tank. Then too these pumps readily work against the pressure caused by the building up of excess formation of gas and here again the top of the tank can easily be injured, this time by blowing outwardly. One method of aiding materially is to provide a floating cover. This does aid but leaves a number of the disadvantages and adds a further disadvantage that these covers are usually quite expensive, usually complicated, and they do tend to leak because of corrosion. When they leak it is extremely difficult to mend the hole in the cover and, more usually than not, it is necessary to take emergency care of the sewage material which must be taken from the digestion tank in order that the workmen can repair the metallic parts of the cover or the associated apparatus which is inside of the digestion tank and consequently subject to the highly corrosive action of the liquid, the latter having at times extremely high acidity falling to a pH below 4.

The present invention not only gives an equal result in a simple and far less costly manner, but it prevents damage due to vacuum or pressure and under no circumstances is it necessary to take the digester out of service as the pumping unit forming an important feature of the present invention can readily be lifted bodily from the digester vat thru the usual overflow pipe.

Figure 1:
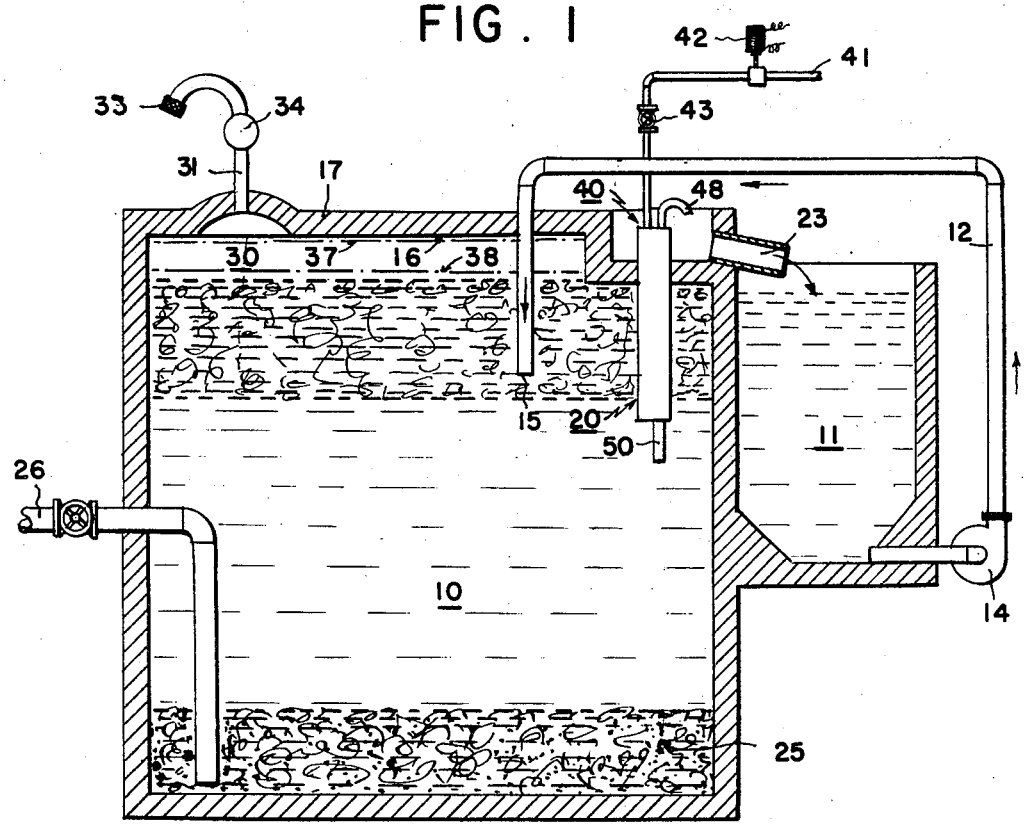
Figure 1 is a vertical section.

The digestion vat or tank 10 receives material from the adjoining sump or sludge well 11 thru a pipe 12 by means of a raw sludge pump 14 which may be of any desired suitable type but which necessarily has to have a high rate of discharge in order properly to handle the heavy heterogeneous organic solids, rags, grit, etc. and the velocity must be sufficient to carry this material into the digester thru the elevated pipe 12 which would usually be perhaps four inches in diameter or larger, emptying at a point such as 15, perhaps four feet below the inside surface 16 of the top panel 17 of the digester. The overflow pipe 20, usually a section of 6 inch cast iron pipe, extends into the tank to a level about that of the discharge end 15 of the pipe 12 or appreciably below this if desired. The top 21 of the overflow pipe is slightly higher than the surface 16 and discharges into a duct 23 returning liquid to the sludge well 11.

The digester 10 collects a layer of solids 25 at its bottom and this is periodically drawn off thru the pipe 26 in well understood manner. The material within the digestion tank 10 forms sewage gases primarily methane, and these collect in a chamber such as 30 at the top of the tank. It is customary to have a dome in the highest point of the top panel 17 of the tank and when such dome is present the exit pipe 31 leads from the dome. The pipe 31, because of the flammable nature of the methane mixture, is provided with a flame trap 33 of the type in common use in gasoline plants and it may and preferably does have a gravity operated simple check valve 34 which permits gas under excess pressure to pass from the chamber 30 to the atmosphere but prevents air entering the chamber 30.

Since normally the withdrawal of material thru the pipe 26 is appreciably less than the quantity of raw sewage entering the plant, it is essential that the water level be kept at a point lower than that of the top 21 of the overflow pipe 20, preferably lowering the water surface each night from a level indicated by the dot and dash line 37 to a level indicated by the lower dot and dash line 38, the top line 37 representing the water surface at the end of the working day and the line 38 representing the water surface early in the morning; the volume between the two lines equalling as far as possible the amount of incoming raw sewage expected during the following day. Except for the provision of an increase in volume of the gas chamber 30 during the night, the digester tank 10 would fill to a level above 16 and consequently an amount of very toxic liquid and stirred up solids, equal in volume to the incoming sewage, would be displaced into the treatment plant not only causing the overloading of the plant but polluting the stream which carries off the usually harmless effluent from the plant.

The removal of material from the digester 10 is accomplished by a special automatic air pump denoted as a whole by the numeral 40. This unit includes an air supply pipe 41 having a time control air solenoid valve 42 and an air regulator valve 43, the latter determining the pressure of air discharged at injection point 45 to the vertical pipe 46 which extends both above and below the junction with the air supply pipe 41. At the top of the pipe 46 I fit over it a slightly larger pipe 47 preferably with a downturned upper end 48. Merely as an example the pipe 46 could be 2½ inches in diameter and the outside pipe 47 could be of three inches in diameter, a thumb screw 49 determining the relative positions of the two pipes 46 and 47.

Similarly at the bottom of the pipe 46 I secure a pipe 50 by means of a set screw such as 51 so that the distance between the bottom of pipe 50 and the entrance point of the air 45 may be such that liquid may be drawn from the digester from strata which at that particular period of the year would be expected to have the least amount of solids. In conformity with current practice the distance of the point 45 below the top 21 of the emergency overflow pipe 20 is twice the distance from the top of the overflow pipe to the level 38 which is desired to obtain in the early morning.

The operation is as follows: During the day at chosen intervals, usually four hours or less, the pump 14 is put in operation and a quantity of sewage is drawn from the bottom of the sludge well 11 and discharged thru the pipe 12 into a layer of heavy scum and solids collecting in the upper portion of the digester, thus raising the water level and placing the sewage gases in chamber 30 under a slight pressure, short of that required to open the one-way check valve 34. Gradually during the day the tank is practically filled and it therefore becomes necessary to remove at night an amount of material equal to the volume of the raw sewage which will be pumped in the next day.

The time controlled valve 42 is opened at such period at night as would permit the digestion tank to become stabilized from the periodic stirring effects which have occurred during the day from the numerous discharges of raw sludge which, as stated, are necessarily pumped in at a high rate in order effectively to carry the heavier particles. The air comes to the pipe 41, which may be a hose, at a steady pressure and the regulating valve 43 is turned so as to permit air to pass thru the pipe 41 and orifice 45 at such a rate that the highly toxic liquid will slowly discharge thru the duct pipe 47 and duct 23 to the sludge well 11 at such rate as just to lower the water level in the digester 10 to the line 38 by the start of the next morning's work. This air lift pump draws the clear but very toxic liquid from a chosen depth in the tank as determined by the positioning of the adjustable sleeve 50.

Figure 2:
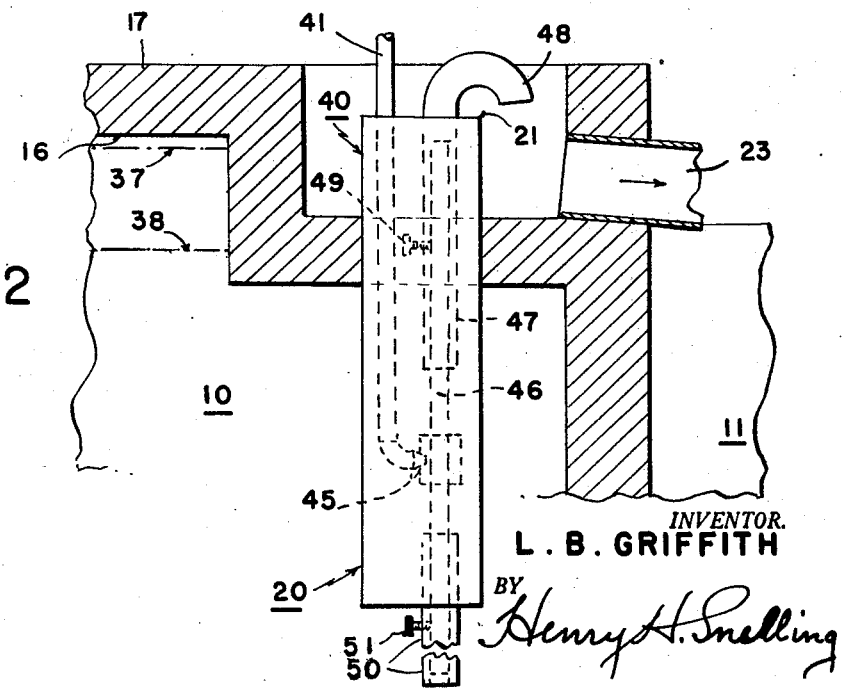
Figure 2 is a fragmentary section on a larger scale showing the air pump in greater detail.

It is quite important that the air pump shall be free of causing danger to the tank and readily be removable from the digester. As noted from Figure 2, the entire air pump unit including the pipe 41, can easily be withdrawn vertically thru the overflow pipe 20 and the repairs can be made when necessary without disturbing in any way the contents of the digester, the overflow pipe being a permanent installation. Should a vacuum tend to form in the chamber 30 the air lift removal pump will simply stop working because the pressure at point 45 becomes insufficient to discharge any fluid. As soon as the conditions change, as for example by greater generation of gas, the pressure rises and the action of the air lift starts automatically as there is always air pressure in the pipe 41. In fact it is quite easy to arrange the rate of pumping out of the digester liquid to be at a slower rate than gas is being generated in the vat, the volume of gas usually being only about half the volume of the raw sludge which will be pumped into the digester. The check valve 34 prevents any possible excess pressure and the automatic stoppage of the air pump prevents any danger due to insufficient pressure.

What I claim is:

1. The combination with a digester tank, a sludge well receiving fresh sewage, a passage between the tank and the sludge well and a pump for moving material through said passage from the sludge well to the tank, of means for pumping material from the tank to the well at chosen periods of time to reduce the volume in the tank, said means comprising an air lift extending into the digester tank to the supernatant liquid therein with time-controlled mechanism for turning on and shutting off the supply of air to said air lift at intervals independently of the gas pressure at the top of the digester, said air lift receiving its air supply at a point below the liquid level in the digester tank whereby the air lift becomes inoperative when the pressure at the top of the tank falls below a selected amount and automatically resumes pumping operation when the pressure is increased above such amount, whereby liquid from the tank may be moved to the sludge well at a slow steady rate during periods of low receipt of sewage into the tank.

2. The combination of claim 1 in which at least one portion of the air lift is vertically movable with respect to the tank to adjust said selected amount to a chosen figure.

References Cited in the file of this patent

UNITED STATES PATENTS

| | | |
|---|---|---|
| 597,249 | Smith | Jan. 11, 1898 |
| 886,053 | Harris | Apr. 28, 1908 |
| 1,420,250 | Gavett | June 20, 1922 |
| 1,806,698 | Miller | May 26, 1931 |
| 1,912,595 | Schlenz | June 6, 1933 |
| 2,335,562 | Downes | Nov. 30, 1943 |
| 2,348,670 | Woodward | May 9, 1944 |
| 2,616,848 | Griffith | Nov. 4, 1952 |
| 2,640,027 | McNamee et al. | May 26, 1953 |